(No Model.)
E. WESTON.
SAFETY CUT-OUT FOR ELECTRO MAGNETIC MOTORS.
No. 289,197. Patented Nov. 27, 1883.
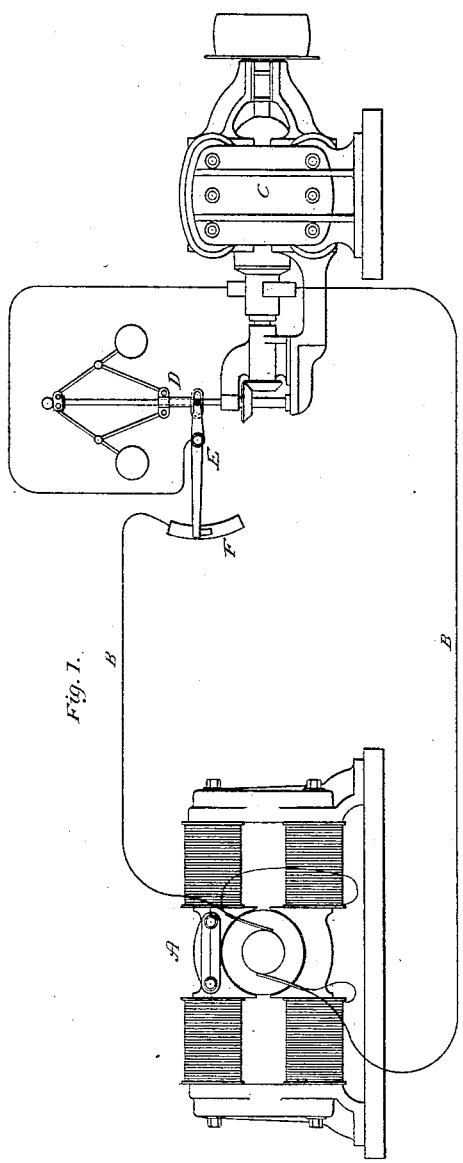
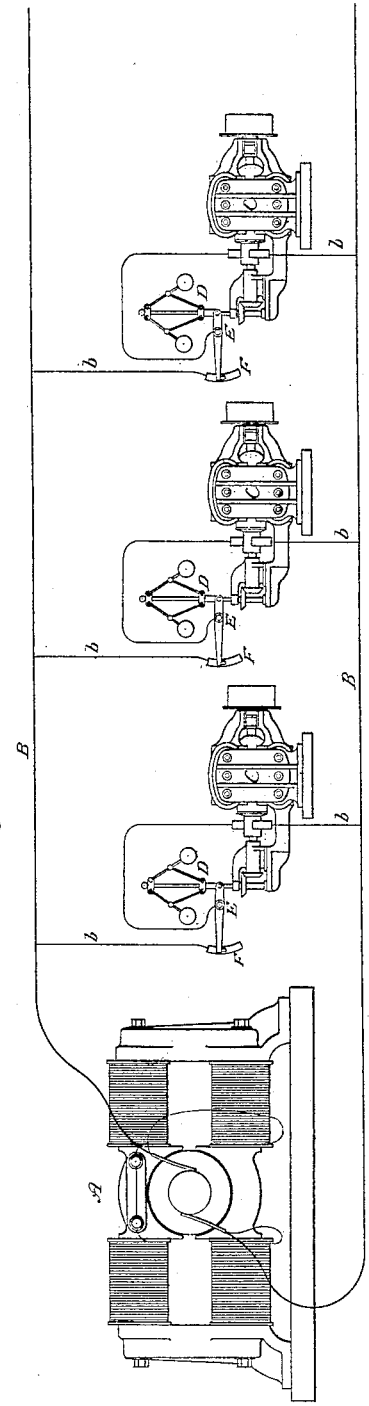
Attest:
Raymond F. Barnes.
W. Frisby
Inventor:
Edward Weston
By Parker W. Page
Atty.

UNITED STATES PATENT OFFICE.

EDWARD WESTON, OF NEWARK, NEW JERSEY, ASSIGNOR TO THE UNITED STATES ELECTRIC LIGHTING COMPANY, OF NEW YORK, N. Y.

SAFETY CUT-OUT FOR ELECTRO-MAGNETIC MOTORS.

SPECIFICATION forming part of Letters Patent No. 289,197, dated November 27, 1883.

Application filed July 2, 1883. (No model.)

*To all whom it may concern:*

Be it known that I, EDWARD WESTON, a subject of the Queen of Great Britain, and residing at Newark, in the county of Essex and State of New Jersey, have invented certain new and useful Improvements in Safety Cut-Outs for Electro-Magnetic Motors, of which the following is a specification, reference being had to the drawings accompanying and forming a part of the same.

It is well known that when an electro-magnetic motor is included in an electric circuit it developes a counter electro-motive force to that of the generator which furnishes the current. This counter electro-motive force is in proportion to the speed of the motor, and, acting in practically the same manner as a resistance, it determines, when other things are equal, the amount of current flowing. If a load be imposed upon the motor—as by causing it to perform a certain amount of work—its speed and its counter electro-motive force fall, and as a slower rate of speed of the motor causes a greater amount of current to flow through it, it may happen that when the speed runs down below a certain limit by reason of overloading, or from any other cause tending to oppose or check its rotation, the coils of the motor, as well as of the generator, are injured by such increase in the current flowing.

The object of my present invention is to prevent the occurrence of such accidents by causing the motor to cut itself out of the circuit when for any cause its speed has reached or fallen below a certain predetermined limit. This I effect by combining with the motor a centrifugal governor, or any device of a similar nature which is capable of assuming a certain position or condition when the speed of the motor has reached or fallen below the prescribed limit, and causing such governor to cut the motor out of circuit when it has reached the condition or position due to such fall in speed.

In the accompanying drawings I have illustrated a simple and practicable means for carrying out my invention, Figure 1 of said drawings illustrating by diagram a generator, a circuit, and single motor included therein and combined with the means for cutting it out of circuit, Fig. 2 illustrating a circuit in which a number of motors are run in multiple-arc branches.

Let A designate an electric generator, B B a circuit from the same, and C an electro-magnetic motor included in the circuit.

D is an ordinary centrifugal governor, though any other device which is operated in a similar manner by variations in the speed of the motor may be substituted for it. The governor is driven by the motor-shaft through proper gearing, and is connected with one end of a pivoted lever, E. A contact-plate, F, is placed in such position that while the motor is running above the lowest limit of speed that is deemed safe, the lever E will be in contact with it, being held in such position by the spreading of the governor-balls. One branch of the circuit B is carried to the contact-plate F, and from the lever E to one of the brushes of the motor-commutator. The other branch leads direct from the generator A to the opposite brush.

In operating these devices the lever E is held by hand in contact with the plate F, or any other provision made for completing the circuit through the motor until the speed of the same has reached a rate that is sufficient to maintain the lever E in contact with the plate F. These conditions hold so long as the motor is running at the proper rate of speed. Should its speed be now checked or reduced below a limit that is readily fixed by experiment and by the adjustment of the cut-out devices, the balls of the governor collapse and shift the lever E off from the plate F, by this means cutting the motor out of circuit and preventing injury to its coils from an abnormal flow of current.

In Fig. 2 are shown a number of motors C, connected with the main circuit B by multiple or cross circuits *b*. Each motor in this case is independent of the others, and when provided with cut-out devices similar to that described will be protected from injuries that might result from the stoppage or slowing down of the armature. The fall in speed below the limit of safety is liable to be caused by a number of causes—such as the overloading of the motor or giving it an amount of work to perform greater than that for which it is designed, or by the binding of the shaft in its bearings, or the like. A device operating in the manner described, however, effectually prevents any injury that might result from such an interruption to the normal action of the motor.

It is obvious that the character of the governing or controlling devices may be greatly varied, and also that the circuit-interrupting devices may have other functions than those herein assigned. For example, it is not essential that the circuit be interrupted or broken, but only that the motor be disconnected from it. This may be effected in many well-known ways.

In patents granted to me I have shown and described means for interrupting the motor-circuit upon a predetermined fall of counter electro-motive force, the action of such means being directly dependent upon such fall or the increased current resulting therefrom; and this I do not claim herein.

I am aware that a centrifugal governor has been heretofore used in combination with a motor for preventing a too rapid motion of the same, and also for regulating the current flowing to the same in proportion to the work done. These features, therefore, I do not claim; but, reserving the right to make subject of other applications features of novelty herein shown or described, but not claimed, what I regard as my invention, and desire to secure by Letters Patent, is—

1. The combination of a generator, a circuit, an electro-magnetic motor, and devices for cutting said motor out of circuit, the said devices being operated by the rotation of the motor, so as to act or be brought into action on a predetermined decrease in the speed of rotation, substantially as and for the purpose specified.

2. The combination, with a generator, a main circuit, and multiple-arc circuits, of motors included in the multiple-arc circuits, and devices for cutting the motors out of their respective circuits, the cut-out devices being operated by the rotation of the motors, so as to act or be brought into action on a predetermined decrease in the speed of rotation, substantially as and for the purpose specified.

3. The combination, with a generator and circuit, of an electro-magnetic motor, centrifugal governor mechanism driven by the motor, and devices for cutting the motor out of circuit, operated or brought into operation by the governor mechanism on a predetermined decrease in the speed of rotation of the motor, substantially as and for the purpose specified.

4. The combination, with a generator and circuit, of an electro-magnetic motor, a centrifugal governor driven by the motor, a contact-plate, and a lever controlled by the governor and adapted to be carried out of contact with the plate, and thereby cut the motor out of circuit when the speed of rotation of the same has decreased to or below a predetermined limit, as and for the purpose specified.

In testimony whereof I have hereunto set my hand this 29th day of June, 1883.

EDWARD WESTON.

Witnesses:
H. A. BECKMEYER,
L. V. E. INNES.